(12) United States Patent
Ganzel

(10) Patent No.: US 12,715,409 B2
(45) Date of Patent: Aug. 25, 2026

(54) BLEED VALVE AND BRAKE SYSTEMS USING SAME

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 429 days.

(21) Appl. No.: 18/447,642

(22) Filed: Aug. 10, 2023

(65) Prior Publication Data

US 2024/0294157 A1 Sep. 5, 2024

Related U.S. Application Data

(60) Provisional application No. 63/450,461, filed on Mar. 7, 2023, provisional application No. 63/449,670, filed (Continued)

(51) Int. Cl.
*B60T 11/30* (2006.01)
*F16K 1/14* (2006.01)
*F16K 5/02* (2006.01)

(52) U.S. Cl.
CPC ................ *B60T 11/30* (2013.01); *F16K 1/14* (2013.01); *F16K 5/02* (2013.01)

(58) Field of Classification Search
CPC ...................................................... B60T 11/30
See application file for complete search history.

(56) References Cited

U.S. PATENT DOCUMENTS 4,902,077 A * 2/1990 Belart .................... B60T 17/222 303/61
5,447,214 A * 9/1995 Appelgren ............ F15B 21/044 188/352

(Continued)

FOREIGN PATENT DOCUMENTS

CN 108973969 A * 12/2018 .............. B60T 15/04
CN 110857082 A * 3/2020 ............ B60T 17/221
CN 110789506 B * 5/2021 ............ B60T 13/745

OTHER PUBLICATIONS

Machine Translation of CN 108973969 A (No Date).*
Machine Translation CN 110857082 A (No Date).*
Machine Translation CN 110789506 B (No Date).*

*Primary Examiner* — Robert A. Siconolfi
*Assistant Examiner* — Shea Woodrow Irvin
(74) *Attorney, Agent, or Firm* — Tarolli, Sundheim, Covell & Tummino LLP

(57) ABSTRACT

A bleed valve includes an elongate bleed valve bore having a first bore end in fluid communication with an ambient space and a second bore end, longitudinally spaced from the first bore end, with a bore lumen extending between the first and second bore ends. An elongate bleed valve shuttle extends partially through the bore lumen for selective reciprocal motion between the first and second bore ends. The bleed valve shuttle has longitudinally spaced first and second shuttle ends selectively located longitudinally adjacent the respective first and second bore ends. The bleed valve shuttle shifts longitudinally toward the first bore end into an operational configuration responsive to presence of a predetermined hydraulic pressure level within the bore lumen along a bleed valve fluid path. Shifting of the bleed valve shuttle into the operational configuration is operative to urge air from the bore lumen into the ambient space.

19 Claims, 3 Drawing Sheets

Related U.S. Application Data on Mar. 3, 2023, provisional application No. 63/449,464, filed on Mar. 2, 2023.

(56) References Cited

U.S. PATENT DOCUMENTS

| | | | | |
|---|---|---|---|---|
| 6,217,129 | B1 * | 4/2001 | Ganzel | B60T 13/686 303/DIG. 11 |
| 10,730,501 | B2 | 8/2020 | Ganzel | |
| 12,115,963 | B2 | 10/2024 | Ganzel | |
| 2020/0307538 | A1 | 10/2020 | Ganzel | |

* cited by examiner 150
180A
180B
172
P
154
156
160
158
162
174
SCA
152
RF
RB
RR
M
178
166
176
170
100
168
S
164
182
184
LR
LF
T

BLEED VALVE AND BRAKE SYSTEMS USING SAME

RELATED APPLICATION

This application claims priority from U.S. Provisional Application No. 63/450,461 filed 7 Mar. 2023, from U.S. Provisional Application No. 63/449,670 filed 3 Mar. 2023, and from U.S. Provisional Application No. 63/449,464 filed 2 Mar. 2023, the subject matter of all of which is incorporated herein by reference in its entirety, for all purposes.

This application is related to the technologies disclosed in one or more of U.S. Provisional Patent Application No. 63/518,687, filed concurrently herewith and titled "PUSH THRU SCA"; U.S. patent application Ser. No. 18/447,490, filed concurrently herewith and titled "Brake Systems with Master Cylinders and Single Corner Actuators"; U.S. patent application Ser. No. 18/447,541, filed concurrently herewith and titled "Brake Systems with Motor-Driven Master Cylinders and Electric Secondary Power Transmission Units"; U.S. patent application Ser. No. 18/447,566, filed concurrently herewith and titled "Brake Systems with Motor-Driven Master Cylinders and Wheel-Side Pressure Sensors"; and U.S. patent application Ser. No. 18/447,609, filed concurrently herewith and titled "Venting Valve and Brake Systems Using Same"; the entire contents of all of which are incorporated herein by reference for all purposes.

TECHNICAL FIELD

This disclosure relates to an apparatus and method for use of a bleed valve, and, more particularly, to methods and apparatus of bleed valves and brake systems using same.

BACKGROUND

A brake system may include anti-lock control including a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Descriptions of prior art brake systems are in U.S. Pat. No. 10,730,501, issued 4 Aug. 2020 to Blaise Ganzel and titled "Vehicle Brake System with Auxiliary Pressure Source", in U.S. Patent Application Publication No. 2020/0307538, published 1 Oct. 2020 by Blaise Ganzel and titled "Brake System with Multiple Pressure Sources", and in U.S. patent application Ser. No. 17/400,250, filed 12 Aug. 2021 by Blaise Ganzel and titled "Apparatus and Method for Control of a Hydraulic Brake System Including Manual Pushthrough", all of which are incorporated herein by reference in their entirety for all purposes.

SUMMARY

In an aspect, a bleed valve is described. An elongate bleed valve bore has a first bore end in fluid communication with an ambient space and a second bore end, longitudinally spaced from the first bore end, with a bore lumen extending between the first and second bore ends. A supply side hydraulic line is in fluid communication with the bore lumen adjacent the second bore end. The supply side hydraulic line is configured to selectively place the bore lumen in fluid communication with a source of pressurized hydraulic fluid. A fill side hydraulic line is in fluid communication with the bore lumen at a location longitudinally interposed between the first bore end and the supply side hydraulic line. The fill side hydraulic line is configured to selectively place the bore lumen in fluid communication with a destination for pressurized hydraulic fluid from the source of pressurized hydraulic fluid along a bleed valve fluid path extending through a portion of the bore lumen. An elongate bleed valve shuttle extends partially through the bore lumen for selective reciprocal motion between the first and second bore ends. The bleed valve shuttle has longitudinally spaced first and second shuttle ends selectively located longitudinally adjacent the respective first and second bore ends. The bleed valve shuttle shifts longitudinally toward the first bore end into an operational configuration responsive to presence of a predetermined hydraulic pressure level within the bore lumen along the bleed valve fluid path. Shifting of the bleed valve shuttle into the operational configuration is operative to urge air from the bore lumen into the ambient space.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
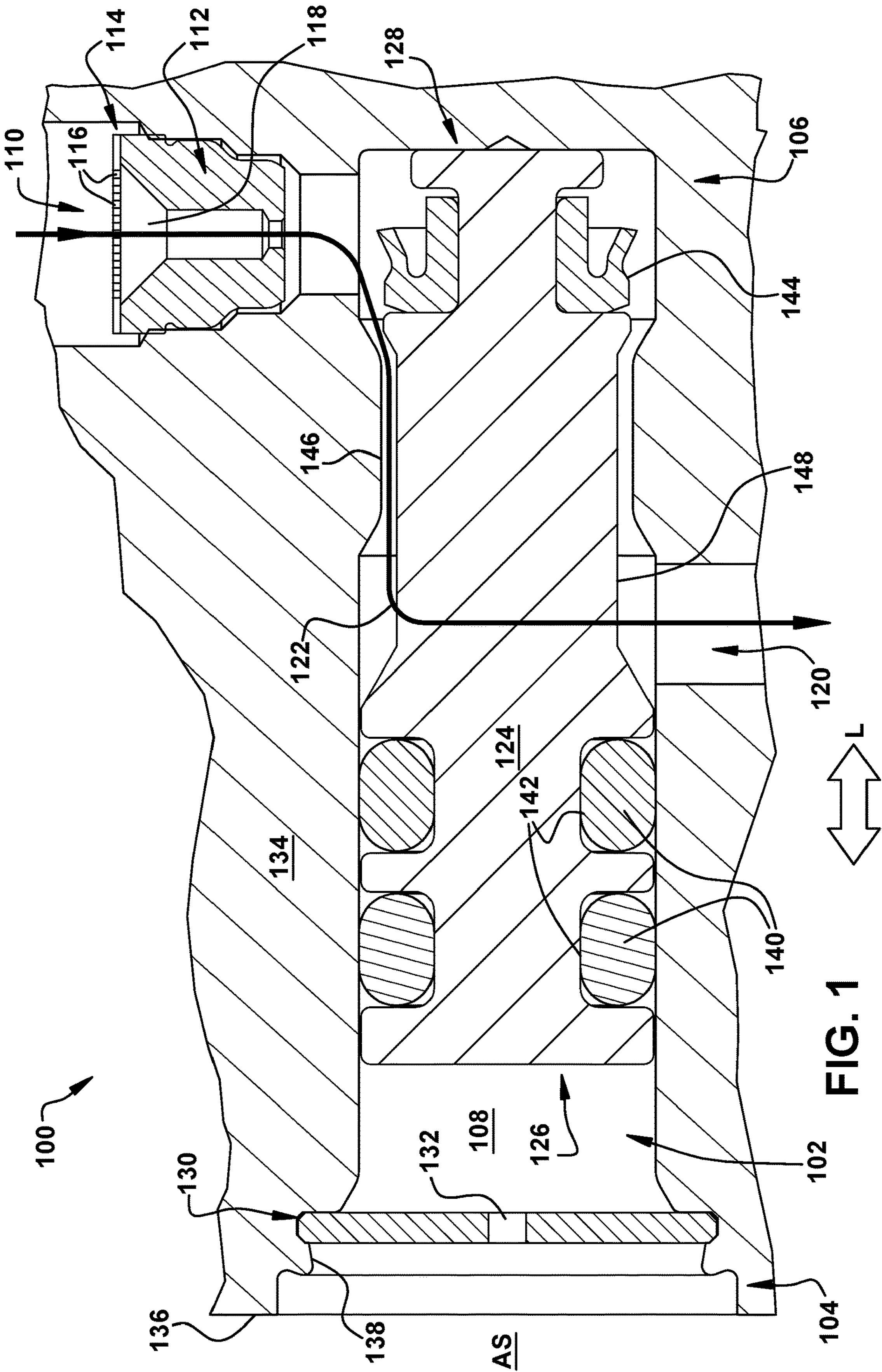
FIG. 1 is a schematic cross-sectional view of a bleed valve according to an aspect of the present invention, in a first configuration.
Figures 2, 3:
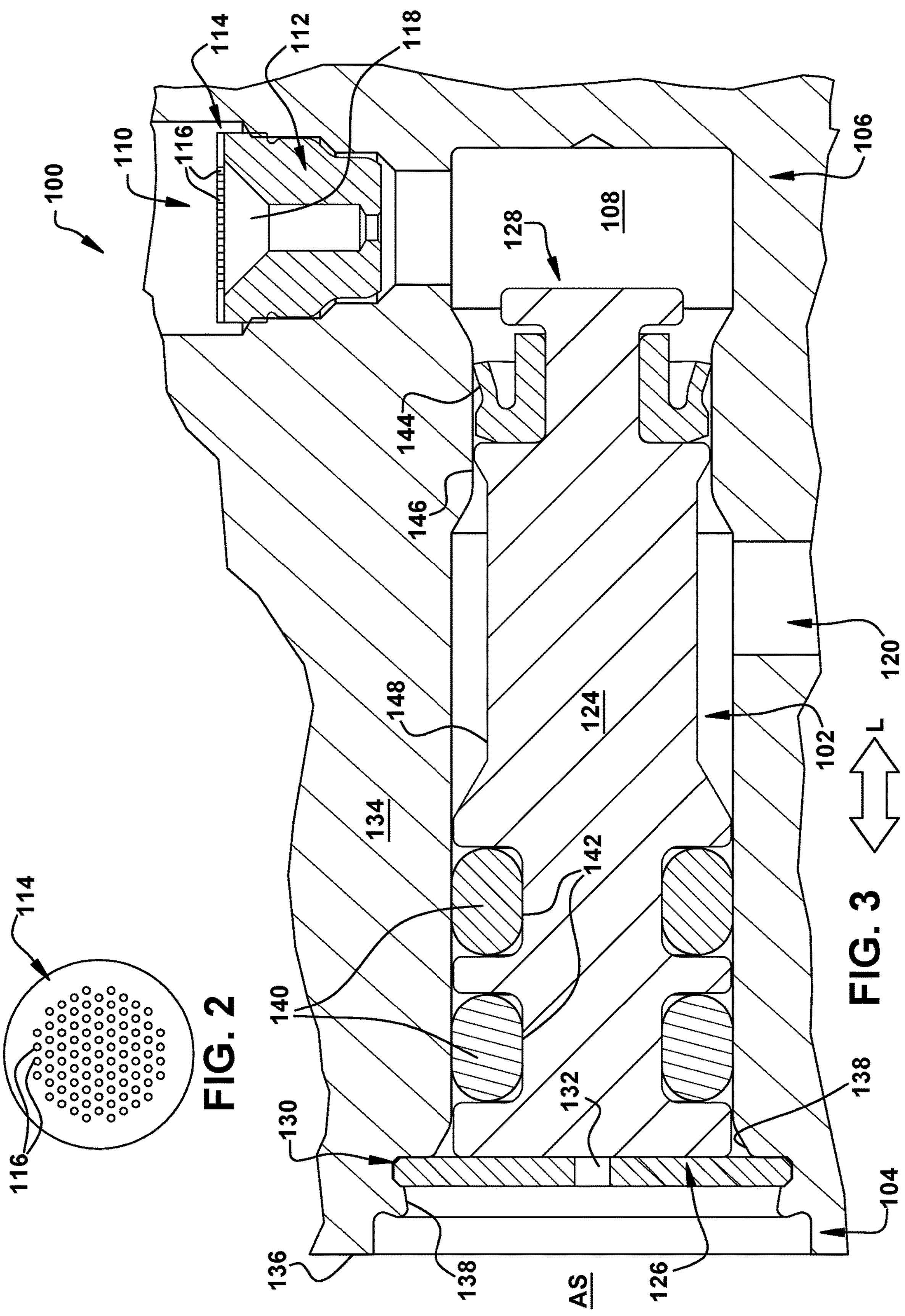
FIG. 2 is a top view of a component of the bleed valve of FIG. 1.
FIG. 3 is a schematic cross-sectional view of the bleed valve of FIG. 1, in a second configuration.

FIGS. 1 and 3 schematically depict differing configurations of a bleed valve 100, comprising an elongate bleed valve bore 102 having first and second bore ends 104 and 106, respectively. The first bore end 104 is in fluid communication with an ambient space. The second bore end 106 is longitudinally spaced from the first bore end 104. The term "longitudinally" is used herein to indicate a direction coincident with the bleed valve bore 102, substantially horizontal in the orientation of FIGS. 1 and 3, and indicated by arrow "L" in the Figures. A bore lumen 108 extends between the first and second bore ends 104 and 106.

A supply side hydraulic line 110 is in fluid communication with the bore lumen 108 at a location adjacent the second bore end 106. The supply side hydraulic line 110 is configured to selectively place the bore lumen 108 in fluid communication with a source of pressurized hydraulic fluid, as will be discussed below.

The supply side hydraulic line 110 may include a reduced-flow-area orifice block 112 adjacent the second bore end 106. This orifice block 112 may be provided for any desired purpose such as, but not limited to, providing a "necked down" area to increase fluid pressure in the supply side hydraulic line 110 by decreasing the local available fluid flow area, in a known manner. Without the orifice block 112, the bleed valve 100 could shuttle closed as soon as fill pressure is applied, but there will still be a vacuum in the plunger chamber, so air could leak in over time. Also, the plunger chamber will eventually fill, but then the reservoir fluid level will be too low. The orifice block 112 facilitates the bleed valve 100 open area and the valve 100 itself to be relatively small, rather than quite large, as would be needed without the orifice block 112.

When present, the orifice block 112 may be interposed hydraulically between a filter plate 114, having a plurality of filter holes 116, and the bore lumen 108. A top view of the filter plate 114 is shown in FIG. 2. It can be seen that the filter holes 116 are located in an area of the filter plate 114 coinciding with the widest portion of the funnel-shaped throughhole 118. This co-location of the filter holes 116 with the widest portion of the throughhole 118 may serve to avoid unintended occlusion of the throughhold 118 by the filter plate 114.

With reference again to FIGS. 1 and 3, a fill side hydraulic line 120 may be in fluid communication with the bore lumen 108 at a location longitudinally interposed between the first bore end 104 and the supply side hydraulic line 110. The fill side hydraulic line 120 is configured to selectively place the bore lumen in fluid communication with a destination for pressurized hydraulic fluid from the source of pressurized hydraulic fluid along a bleed valve fluid path (shown schematically at 122) extending through a portion of the bore lumen 108. For ease of description, the source of, and destination for, hydraulic fluid are largely described herein as routing the pressurized hydraulic fluid along the bleed valve fluid path 122 from top to bottom of the bleed valve 100, as shown in the orientation of FIGS. 1 and 3. It is contemplated, however, that the source of, and destination for, hydraulic fluid could be temporarily or permanently reversed at any point during operation of the bleed valve 100 as desired, such that pressurized hydraulic fluid, or another fluid, may flow "backward" along the bleed valve fluid path 122 from bottom to top of the bleed valve 100, as shown in the orientation of FIGS. 1 and 3. (E.g., air will flow "backward" along the bleed valve fluid path 122 during the evacuation phase of an evacuate-and-fill bleed procedure.) One of ordinary skill in the art can readily grasp the operation of the bleed valve 100 upon reference to the present disclosure, and can provide a suitable bleed valve 100 arrangement for a particular use environment.

An elongate bleed valve shuttle 124 extends partially through the bore lumen 108 for selective reciprocal motion between the first and second bore ends 104 and 106. The bleed valve shuttle 124 has longitudinally spaced first and second shuttle ends 126 and 128, respectively, which are selectively located longitudinally adjacent the respective first and second bore ends 104 and 106.

A bleed valve cap 130 may selectively occlude the bore lumen 108 at the first bore end 104. When present, the bleed valve cap 130 may include a bleed aperture 132 extending longitudinally therethrough to permit fluid (e.g., air) communication between the bore lumen 108 and the ambient space AS. As shown schematically in FIGS. 1 and 3, the valve bore 102, the supply side hydraulic line 110, and the fill side hydraulic line 120 may be collectively defined within a housing block 134. The valve bore 102 is contiguous with an outer surface 136 of the housing block 134 which is located in the ambient space AS. The bleed valve cap 130 may thus be mechanically engaged with an inner wall 138 of the valve bore 102 to resist egress from the housing block 134. This may be accomplished, for example, by the bleed valve cap 130 being staked or crimped into the housing block 134 after the bleed valve shuttle 124 is placed within.

The bleed valve shuttle 124 is provided preliminarily to a user in an initial configuration (the "first configuration" of FIG. 1), is installed into a brake system in that initial configuration as described below, and then shifts longitudinally toward the first bore end 104 into an operational configuration (the "second configuration" of FIG. 3) responsive to presence of a predetermined hydraulic pressure level within the bore lumen 108 along the bleed valve fluid path 122. For example, the bleed valve 100 could be provided with the bleed valve shuttle 124 in the initial configuration as a brake system is being manufactured, and then shift into the operational configuration responsive to the first filling of the brake system with hydraulic fluid. Regardless of when and how it happens, shifting of the bleed valve shuttle 124 into the operational configuration is operative to urge air out from the bore lumen 108 and into the ambient space AS, to assist with bleeding air from the brake system containing the bleed valve 100.

In many use environments, the bleed valve shuttle 124 may shift from the initial configuration into the operational configuration once, during the initial startup hydraulic filling of the brake system by a manufacturer of a vehicle containing the brake system. As a result, the bleed valve shuttle 124 could be maintained in the operational configuration for the vast majority of its service life once installed into a brake system which becomes filled with hydraulic fluid. Accordingly, the bleed valve 100 may be devoid of any biasing member tending to urge the bleed valve shuttle 124 longitudinally toward at least one of the first and second bore ends 104 and 106—the operational configuration of the bleed valve shuttle 124 is maintained naturally by fluid pressure and/or seal friction within the brake system. It is contemplated, though, that a rod (not shown) or other tool could be inserted through the bleed aperture 132 to push the bleed valve shuttle 124 back toward the initial configuration, as desired—for example, if a service bleed is performed on the brake system and an evac/fill procedure is desired to be carried out. I.e., once the system has brake fluid in it, it would be exceedingly difficult to perform an evacuate and fill bleed procedure, even if the bleed valve 100 is opened. One reason to open the bleed valve 100 is if it shuttles closed during an air test before the evacuation and fill procedure, for example.

In the case of a return of the bleed valve shuttle 124 to the initial configuration, it is contemplated that the bleed valve shuttle 124 could once again be returned to, and maintained in, the operational configuration responsive to renewed presence of the predetermined hydraulic pressure level within the bore lumen 108.

Stated more broadly, the bleed valve shuttle 124 may shift into the operational configuration responsive to the presence of the predetermined hydraulic pressure level within the bore lumen 108 along the bleed valve fluid path 122 and may be maintained in the operational configuration until at least one resetting condition occurs. After the bleed valve shuttle 124 moves into the operational configuration hydraulically, it can be reset to the initial configuration, but hydraulic fluid will likely need to be blown out of all the passages in the bleed valve 100 before an evacuation and fill procedure can be done. The bleed valve 100 will probably need to be mechanically held open if the hydraulic fluid is blown out, to prevent the bleed valve shuttle 124 from shifting into the operational configuration.

The at least one resetting condition can include, but is not limited to, (in no particular order):

- exertion of a longitudinally-oriented resetting force from the direction of the first bore end 104 upon the first shuttle end 126 (e.g., the aforementioned push-rod through the bleed aperture 132, pneumatic pressure exerted upon the first shuttle end 126, or any other force sufficient to push the bleed valve shuttle 124 toward the second bore end 106),
- generation of a predetermined amount of negative hydraulic fluid pressure along the bleed valve fluid path 122 (e.g., sufficient pressure to "pull" the bleed valve shuttle 124 toward the second bore end 106), and/or
- substantial removal of hydraulic fluid and/or air from the bleed valve fluid path 122 (again, e.g., leaving a void sufficient to "pull" the bleed valve shuttle 124 toward the second bore end 106).

At least one sealing ring 140 may be interposed laterally between the bleed valve shuttle 124 and the inner wall 138 of the bore lumen 108 at a portion of the bleed valve shuttle 124 longitudinally interposed between the fill side hydraulic line 120 and the first shuttle end 126. The term "laterally" is used herein to indicate a direction substantially perpendicular to the longitudinal direction. For example, and as shown in FIGS. 1 and 3, each sealing ring 140 may be held within a sealing groove 142. When present, the at least one sealing ring 140 may substantially occlude fluid communication between the first and second shuttle ends 126 and 128 along the inner wall 138 of the bore lumen 108 past an outer surface of the bleed valve shuttle 124. As shown in the Figures, at least one sealing ring 140 may be circular, ovoid, curved, or curvilinear in cross-section and may be configured to be substantially symmetrical in cross-section, to resist fluid travel in both longitudinal directions therepast. The at least one sealing ring 140 may also or instead be configured to provide a predetermined amount of frictional force to resist longitudinal motion of the bleed valve shuttle 124 with respect to the bore lumen 108, and thus help maintain the bleed valve shuttle 124 in the initial configuration of FIG. 1, the operational configuration of FIG. 3, or any position therebetween.

At least one shaped sealing ring 144 may be interposed laterally between the bleed valve shuttle 124 and an inner wall 138 of the bore lumen 108 at a portion of the bleed valve shuttle 124 adjacent the supply side hydraulic line 110 and the second shuttle end 128. When present, the shaped sealing ring 144 may be operative to allow selective passage of hydraulic fluid from the fill side hydraulic line 120 toward the supply side hydraulic line 110 when the bleed valve shuttle is in the operational condition. Accordingly, the shaped sealing ring 144 may have a directional cross-sectional configuration similar to that of a known lip seal or recup seal, with a "skirt" portion flaring outward from the bleed valve shuttle 124 as shown in FIGS. 1 and 3. The selective passage of hydraulic fluid from the fill side hydraulic line 120 toward the supply side hydraulic line 110 may be a very small amount attributable to, for example, thermal expansion of hydraulic fluid associated with the fill side hydraulic line 120

The valve bore 102 may include a reduced-diameter bore neck section 146 interposed longitudinally between the supply side hydraulic line 110 and the fill side hydraulic line 120. As depicted in FIG. 3, the shaped sealing ring 144 may be interposed laterally between the bleed valve shuttle 124 and the bore neck section 146 in a "cork in bottle neck" fashion, when the bleed valve shuttle 124 is in the operational condition.

The bleed valve shuttle 124 may include a reduced-diameter shuttle neck section 148 spaced from both the first and second shuttle ends 126 and 128. The shuttle neck section 148, when present, helps to define an annular space laterally between the bleed valve shuttle 124 and the inner wall 138 of the bleed valve bore 102, from which hydraulic fluid can potentially be urged past the shaped sealing ring 144 and toward the supply side hydraulic line 110. The shuttle neck section 148 and the bore neck section 146, when present, may be at least partially laterally adjacent regardless of a longitudinal position of the bleed valve shuttle 124 within the valve bore 102.

Figure 4:
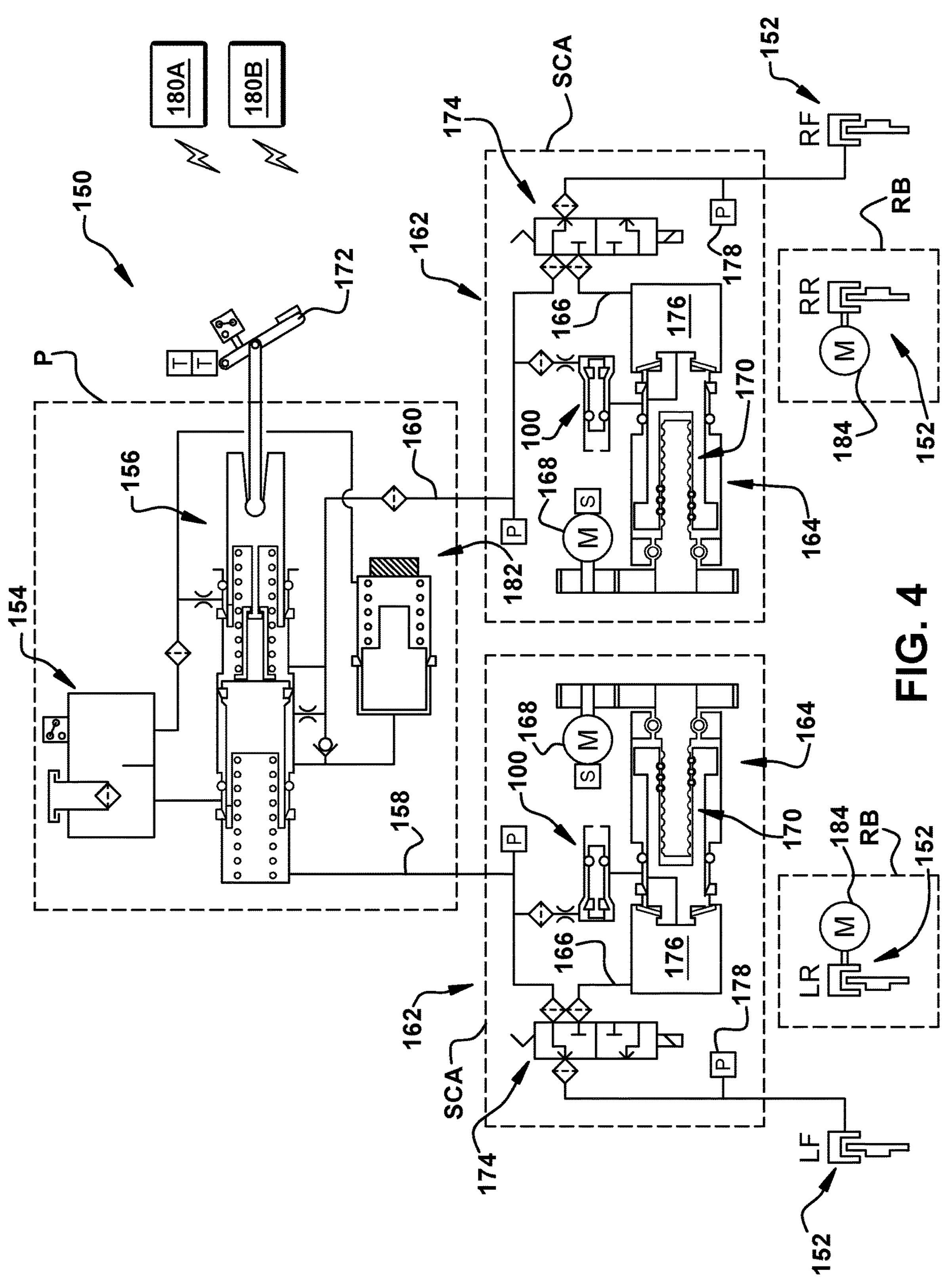
FIG. 4 is a schematic hydraulic diagram of a brake system including the bleed valve of FIG. 1.

Turning now to FIG. 4, an example brake system 150 for actuating a plurality of wheel brakes 152 comprising at least first and second wheel brakes LF and RF using the bleed valve 100 is depicted. The brake system 150 is shown here as a hydraulic braking system, in which fluid pressure is utilized to apply braking forces for the brake system 150. The brake system 150 may suitably be used on a ground vehicle, such as an automotive vehicle having four wheels with a wheel brake associated with each wheel. Furthermore, the brake system 150 can be provided with other braking functions such as anti-lock braking (ABS) and other slip control features to effectively brake the vehicle. Components of the brake system 150 may be housed in one or more blocks or housings. The blocks or housings may be made from solid material, such as aluminum, that has been drilled, machined, or otherwise formed to house the various components. Fluid conduits may also be formed in the block or housing.

Each of the wheel brakes 152 may include, for example, a brake caliper mounted on the vehicle to engage a frictional element (such as a brake disc) that rotates with a vehicle wheel to effect braking of the associated vehicle wheel. The wheel brakes 152 can be associated with any combination of front and rear wheels of the vehicle in which the corresponding brake system 150 is installed. For example, the brake system 150 may be configured as a vertically split or diagonally split system. No differentiation is made herein among the wheel brakes 152, for the purposes of this description, though one of ordinary skill in the art could readily provide a suitable braking arrangement for a particular use environment.

The brake system 150 includes a reservoir 154 to store and hold hydraulic fluid for the brake system 150. A manually operable master cylinder 156 is in fluid communication with the reservoir 154 and is operable during a backup braking mode to generate pressurized hydraulic fluid at first and second MC outputs 158 and 160, respectively, for hydraulically actuating the first and second wheel brakes LF and RF, respectively. This backup braking mode is termed "manual push-through" and can result in the provision of pressurized hydraulic fluid in a known manner when other portions of the brake system 150 are not available for use for some reason. The master cylinder ("MC") 156 shown in the Figures is a dual-chamber type master cylinder and is operable to generate pressurized fluid via manual force applied to a brake pedal 172 by a user.

The brake system 150 also includes a plurality of single corner actuators ("SCA") 162. Each single corner actuator 162 is hydraulically interposed between a selected one of the first and second MC outputs 158 and 160 and a corresponding one of the first and second wheel brakes LF and RF. Each SCA 162 includes a secondary power transmission unit ("PTU") 164 configured for selectively providing pressurized hydraulic fluid at an SCA output 166 for actuating the respective wheel brake in at least one of a normal non-failure braking mode and a backup braking mode. The secondary PTU 164 includes an electric PTU motor 168 configured to selectively pressurize the hydraulic fluid by transmitting rotary motion to a plunger assembly 170 of the secondary PTU 164.

At least one two-position three-way valve 174 is included in the SCA 162 and may be interposed hydraulically between the plunger assembly 170 and the respective wheel brake LF or RF for selectively controlling provision of hydraulic fluid to the respective wheel brake LF or RF from at least one of the plunger assembly 170 and the master cylinder 156. For example, and as shown in FIG. 4, the three-way valve 174 routes pressurized hydraulic fluid from the MC 156 (via corresponding first or second MC output 158 or 160) to the respective wheel brake LF or RF when the three-way valve 174 is de-energized—such as if the electrical portion of the brake system 150 has failed, or if such routing is desired. The three-way valve 174 can be energized to route pressurized hydraulic fluid from the secondary PTU 164 (via corresponding SCA output 166) to the respective wheel brake LF or RF, such as during the normal non-failure braking mode.

Each SCA 162 also includes a bleed valve 100 such as that previously described and as shown in FIGS. 1-3. The selected one of the first and second MC outputs 158 or 160 for that SCA 162 serves as the supply side hydraulic line 110, and the fill side hydraulic line 120 is in fluid communication with a plunger cavity 176 of the corresponding plunger assembly 170. The bleed valve shuttle 124 is urged to the operational configuration during initial hydraulic fill of the corresponding SCA 162 and remains in the operational configuration throughout subsequent operation of the brake system 150. In many use environments, shuttling of the bleed valve 100 into the operational configuration will "cut off" fluid flow from the first or second MC output 158 or 160 throughout the service life of the brake system 150, and will only permit a very minor amount of hydraulic fluid to seep from the plunger cavity 176 back toward the first or second MC output 158 or 160 past the shaped sealing ring 144, as previously mentioned. (The total fluid volume of the plunger cavity 176 can then be replenished as desired indirectly from the reservoir 154 through the wheel brake LF or RF, in a known manner, when the three-way valves 174 are de-energized.) However accomplished, though, it should be understood that each single corner actuator 162 is indirectly fluidly connected to the reservoir 154 via the master cylinder 156.

At least one electronic control unit ("ECU") 180 may be provided for controlling at least one of the secondary power transmission units 164 and the two-position three-way valves 174 responsive to at least one brake pressure signal, with first and second ECUs 180A, 180B being shown and described herein. The ECUs 180A, 180B may include microprocessors and other electrical circuitry. The ECUs 180A, 180B receive various signals, process signals, and control the operation of various electrical components of a corresponding brake system 150 in response to the received signals, in a wired and/or wireless manner. For example, the ECU(s) 180A and/or 180B may control at least one of the secondary power transmission unit 164 and the three-way valve 174 responsive to the braking signal generated by the brake pedal 172 of the master cylinder 156.

The ECUs 180A, 180B can be connected to various sensors such as a reservoir fluid level sensor, pressure sensors, travel sensors, switches, wheel speed sensors, and steering angle sensors. The ECUs 180A, 180B may also be connected to an external module (not shown) for receiving information related to yaw rate, lateral acceleration, longitudinal acceleration of the vehicle, or other characteristics of vehicle operation for any reason, such as, but not limited to, controlling the brake system 150 during vehicle braking, stability operation, or other modes of operation. Additionally, the ECUs 180A, 180B may be connected to the instrument cluster for collecting and supplying information related to warning indicators such as an ABS warning light, a brake fluid level warning light, and a traction control/vehicle stability control indicator light. It is contemplated that at least one of the ECUs 180A and 180B may be, for example, integrated into at least one of the secondary PTUs 164.

When there are two ECUs provided to the brake system 150, the first ECU 180A may be operative to control the electric PTU motor 168 of a selected SCA 162, and any desired one(s) of the three-way valves 174. The second ECU 180B may be operative to control the electric PTU motor 168 of another SCA 162, and any desired one(s) of the three-way valves 174. One of ordinary skill in the art can readily provide a brake system 150 having desired ECU 180 properties and redundancy for a particular use environment.

An example of a suitable ECU 180 arrangement is disclosed in co-pending U.S. patent application Ser. No. 17/708,019, filed 30 Mar. 2022 and titled "Control Arrangement for a Brake System", hereafter referenced as "the backed-up ECU"), which is incorporated by reference herein in its entirety for all purposes.

A brake simulator (shown generally at 182) may be provided in hydraulic connection to the master cylinder 156 for providing desired brake pedal response, assisting with routing hydraulic fluid between other components of the brake system 150, or for any other reason. One of ordinary skill in the art can readily configure a suitable brake simulator 182 for a particular use environment.

Each of the single corner actuators 162 may be carried by a respective SCA housing (which can be the same as the housing block 134 previously discussed with particularity as corresponding to the bleed valve 100), which is depicted schematically by dashed lines "SCA" in FIG. 4. The reservoir and master cylinder may be collectively carried by a primary housing, which is depicted schematically by dashed line "P" in FIG. 4. The primary housing and each SCA housing may all be spaced mutually apart from one another. It is contemplated that each SCA housing may be located immediately adjacent a corresponding wheel brake RF or LF, as desired.

As shown in FIG. 4, the brake system 150 may include third and fourth wheel brakes 152, labeled as LR and RR, respectively. Each of the third and fourth wheel brakes LR and RR may be actuated by at least one of an electric brake motor 184 and an additional, separately provided single corner actuator (not shown, but substantially similar to the SCAs 162 discussed above and shown as associated with the first and second wheel brakes LF and RF in the Figures. The third and fourth wheel brakes LR and RR, and/or their associated electric brake motor 184 and/or single corner actuator(s) may be housed in separate rear brake housings (depicted schematically by dashed lines "RB" in FIG. 4), which may be spaced apart form the primary housing and each SCA housing.

It is contemplated that various other components, such as electric service and/or parking brake motors, could be provided by one of ordinary skill in the art to achieve desired configurations for particular use environments, in any of the brake systems described herein. For example, while a number of filters and pressure sensors 178 are shown in the Figures, specific description thereof has been omitted herefrom for brevity, as one of ordinary skill in the art will readily understand how to provide a desired number, placement, and/or operation of filters, sensors, and any other components as desired for a particular use environment of the present invention.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for actuating a plurality of wheel brakes comprising at least first and second wheel brakes, the system comprising:

- a reservoir;
- a master cylinder in fluid communication with the reservoir and operable during a backup braking mode to generate pressurized hydraulic fluid at first and second MC outputs for hydraulically actuating the first and second wheel brakes, respectively;
- a plurality of single corner actuators, each single corner actuator being hydraulically interposed between a selected one of the first and second MC outputs and a corresponding one of the first and second wheel brakes, each single corner actuator including a secondary power transmission unit configured for selectively providing pressurized hydraulic fluid at an SCA output for actuating the respective wheel brake in at least one of a normal non-failure braking mode and a backup braking mode, the secondary power transmission unit including an electric PTU motor configured to selectively pressurize the hydraulic fluid by transmitting rotary motion to a plunger assembly of the secondary power transmission unit;

at least one two-position three-way valve interposed hydraulically between the plunger assembly and the respective wheel brake for selectively controlling provision of hydraulic fluid to the respective wheel brake from at least one of the plunger assembly and the master cylinder; and a bleed valve including;

an elongate bleed valve bore having a first bore end in fluid communication with an ambient space and a second bore end, longitudinally spaced from the first bore end, with a bore lumen extending between the first and second bore ends;

a supply side hydraulic line in fluid communication with the bore lumen adjacent the second bore end, the supply side hydraulic line being configured to selectively place the bore lumen in fluid communication with a source of pressurized hydraulic fluid;

a fill side hydraulic line in fluid communication with the bore lumen at a location longitudinally interposed between the first bore end and the supply side hydraulic line, the fill side hydraulic line being configured to selectively place the bore lumen in fluid communication with a destination for pressurized hydraulic fluid from the source of pressurized hydraulic fluid along a bleed valve fluid path extending through a portion of the bore lumen; and an elongate bleed valve shuttle extending partially through the bore lumen for selective reciprocal motion between the first and second bore ends, the bleed valve shuttle having longitudinally spaced first and second shuttle ends selectively located longitudinally adjacent the respective first and second bore ends;

wherein the bleed valve shuttle shifts longitudinally toward the first bore end into an operational configuration responsive to presence of a predetermined hydraulic pressure level within the bore lumen along the bleed valve fluid path, shifting of the bleed valve shuttle into the operational configuration being operative to urge air from the bore lumen into the ambient space;

wherein the selected one of the first and second MC outputs is the supply side hydraulic line and the fill side hydraulic line is in fluid communication with a plunger cavity of the plunger assembly, wherein the bleed valve shuttle is urged to the operational configuration during initial hydraulic fill of the single corner actuator and remains in the operational configuration throughout subsequent operation of the brake system; and an electronic control unit for controlling at least one of the secondary power transmission unit and the two-position three-way valve responsive to at least one brake pressure signal;

wherein each single corner actuator is indirectly fluidly connected to the reservoir via the master cylinder.

2. The brake system of claim 1, wherein at least one sealing ring is interposed laterally between the bleed valve shuttle and an inner wall of the bore lumen at a portion of the bleed valve shuttle longitudinally interposed between the fill side hydraulic line and the first shuttle end, the at least one sealing ring substantially occluding fluid communication between the first and second shuttle ends.

3. The brake system of claim 2, wherein the at least one sealing ring is configured to provide a predetermined amount of frictional force to resist longitudinal motion of the bleed valve shuttle with respect to the bore lumen.

4. The brake system of claim 1, wherein the bleed valve shuttle shifts into the operational configuration responsive to the presence of the predetermined hydraulic pressure level within the bore lumen along the bleed valve fluid path and is maintained in the operational configuration until at least one resetting condition occurs.

5. The brake system of claim 4, wherein the at least one resetting condition includes exertion of a longitudinally-oriented resetting force from the first bore end upon the first shuttle end, generation of a predetermined amount of negative hydraulic fluid pressure along the bleed valve fluid path, and substantial removal of hydraulic fluid from the bleed valve fluid path.

6. The brake system of claim 1, wherein the supply side hydraulic line includes a reduced-flow-area orifice block adjacent the second bore end.

7. The brake system of claim 6, wherein the orifice block is interposed between a filter plate, having a plurality of filter holes, and the bore lumen.

8. The brake system of claim 1, wherein a bleed valve cap selectively occludes the bore lumen at the first bore end, the bleed valve cap including a bleed aperture extending longitudinally therethrough to permit fluid communication between the bore lumen and the ambient space.

9. The brake system of claim 1, wherein the valve bore, the supply side hydraulic line, and the fill side hydraulic line are collectively defined within a housing block, the valve bore being contiguous with an outer surface of the housing block located in the ambient space.

10. The brake system of claim 9, wherein a bleed valve cap selectively occludes the bore lumen at the first bore end, the bleed valve cap including a bleed aperture extending longitudinally therethrough to permit fluid communication between the bore lumen and the ambient space, and the bleed valve cap is mechanically engaged with an inner wall of the valve bore to resist egress from the housing block.

11. The brake system of claim 1, wherein at least one shaped sealing ring is interposed laterally between the bleed valve shuttle and an inner wall of the bore lumen at a portion of the bleed valve shuttle adjacent the supply side hydraulic line and the second shuttle end, the shaped sealing ring being operative to allow selective passage of hydraulic fluid from the fill side hydraulic line toward the supply side hydraulic line when the bleed valve shuttle is in the operational condition.

12. The brake system of claim 1, wherein the valve bore includes a reduced-diameter bore neck section interposed longitudinally between the supply side hydraulic line and the fill side hydraulic line.

13. The brake system of claim 11, wherein the valve bore includes a reduced-diameter bore neck section interposed longitudinally between the supply side hydraulic line and the fill side hydraulic line, and wherein the shaped sealing ring is interposed laterally between the bleed valve shuttle and the bore neck section when the bleed valve shuttle is in the operational condition.

14. The brake system of claim 1, wherein the bleed valve is devoid of any biasing member tending to urge the bleed valve shuttle longitudinally toward at least one of the first and second bore ends.

15. The brake system of claim 1, wherein the bleed valve shuttle includes a reduced-diameter shuttle neck section spaced from both the first and second shuttle ends.

16. The brake system of claim 15, wherein:

at least one sealing ring is interposed laterally between the bleed valve shuttle and an inner wall of the bore lumen at a portion of the bleed valve shuttle longitudinally interposed between the first shuttle end and the shuttle neck section, the at least one sealing ring substantially occluding fluid communication between the first and second shuttle ends;

at least one shaped sealing ring is interposed laterally between the bleed valve shuttle and an inner wall of the bore lumen at a portion of the bleed valve shuttle longitudinally interposed between the shuttle neck section and the second shuttle end, the shaped sealing ring being operative to allow selective passage of hydraulic fluid from the fill side hydraulic line toward the supply side hydraulic line when the bleed valve shuttle is in the operational condition;

the valve bore includes a reduced-diameter bore neck section interposed longitudinally between the supply side hydraulic line and the fill side hydraulic line; and the shuttle neck section and the bore neck section are at least partially laterally adjacent regardless of a longitudinal position of the bleed valve shuttle within the valve bore.

17. The brake system of claim 1, wherein the master cylinder is operable to generate pressurized fluid via manual force applied to a brake pedal by a user.

18. The brake system of claim 1, including third and fourth wheel brakes, each of the third and fourth wheel brakes being actuated by an electric brake motor.

19. The brake system of claim 1, wherein each of the single corner actuators is carried by a respective SCA housing, the reservoir and master cylinder are collectively carried by a primary housing, and the primary housing and each SCA housing are all spaced mutually apart from one another.

* * * * *